United States Patent
Cao et al.

(10) Patent No.: US 8,954,452 B2
(45) Date of Patent: Feb. 10, 2015

(54) METHOD AND APPARATUS FOR CHARACTERIZING USER BEHAVIOR PATTERNS FROM USER INTERACTION HISTORY

(75) Inventors: Happia Cao, Beijing (CN); Jilei Tian, Beijing (CN)

(73) Assignee: Nokia Corporation, Espoo (FI)

( * ) Notice: Subject to any disclaimer, the term of this patent is extended or adjusted under 35 U.S.C. 154(b) by 2 days.

(21) Appl. No.: 13/574,661

(22) PCT Filed: Feb. 4, 2010

(86) PCT No.: PCT/CN2010/070521
§ 371 (c)(1),
(2), (4) Date: Jul. 23, 2012

(87) PCT Pub. No.: WO2011/094940
PCT Pub. Date: Aug. 11, 2011

(65) Prior Publication Data
US 2012/0296909 A1    Nov. 22, 2012

(51) Int. Cl.
*G06F 7/00*          (2006.01)
*G06F 17/30*         (2006.01)

(52) U.S. Cl.
CPC .... *G06F 17/30702* (2013.01); *G06F 17/30867* (2013.01)

USPC .......................................................... 707/749

(58) Field of Classification Search
CPC .............. G06Q 30/0269; G06Q 30/02; G06Q 30/0631; G06Q 10/06; G06Q 10/0631; G06Q 10/0633; G06Q 30/0206
USPC .......................................................... 707/749
See application file for complete search history.

(56) References Cited

U.S. PATENT DOCUMENTS

2004/0078817 A1*  4/2004  Horowitz et al. ............... 725/58
2006/0200432 A1*  9/2006  Flinn et al. ...................... 706/12

* cited by examiner

*Primary Examiner* — Truong Vo
(74) *Attorney, Agent, or Firm* — Ditthavong & Steiner, PC

(57) ABSTRACT

An approach is provided for characterizing user behavior patterns. The behavior pattern platform receives a plurality of context records from a device. Next, the behavior pattern platform places one or more contexts from the context records. Then, the behavior pattern platform places the contexts into one or more context groups. Then, the behavior pattern platform receives interaction data from the device, associates the context groups with the interaction data, and determines a behavior pattern based, at least in part, on the association of the context groups and the interaction data.

20 Claims, 12 Drawing Sheets

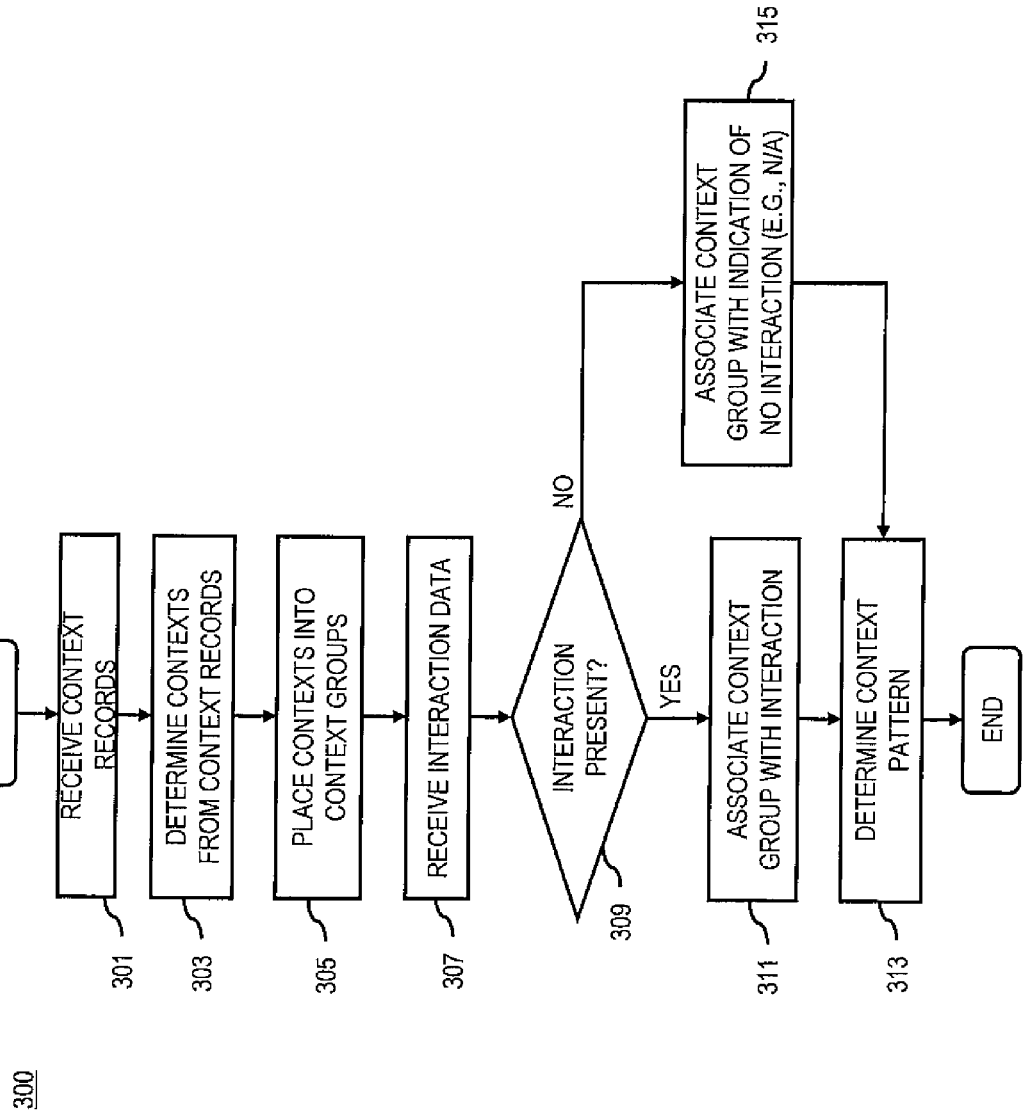

500

530

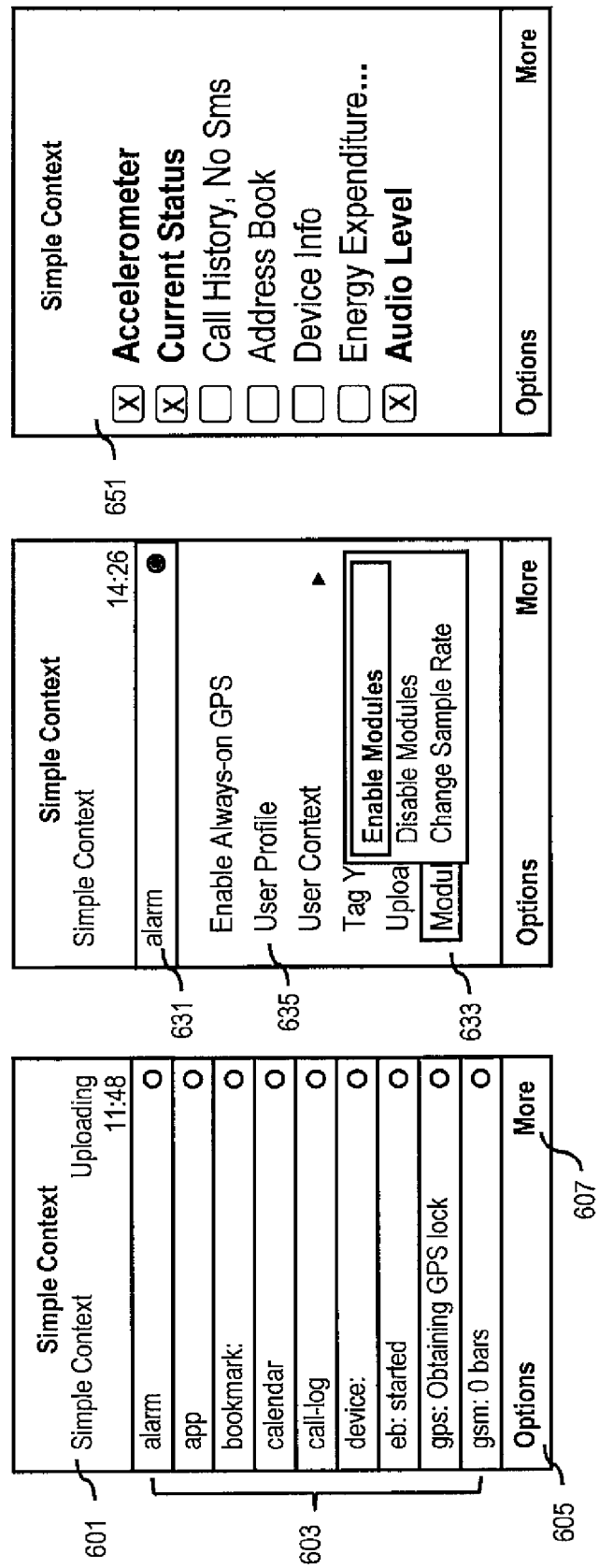

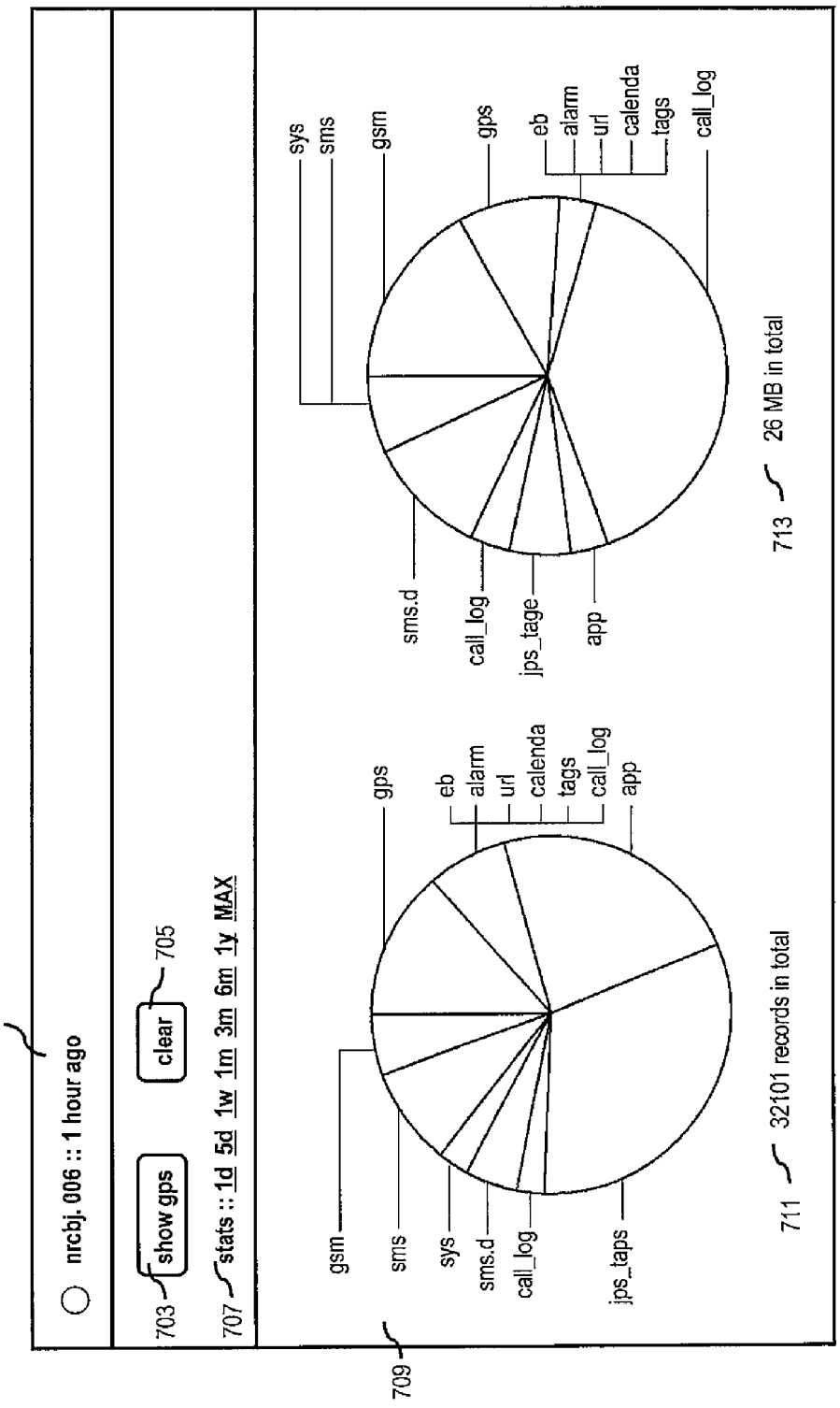

METHOD AND APPARATUS FOR CHARACTERIZING USER BEHAVIOR PATTERNS FROM USER INTERACTION HISTORY

RELATED APPLICATION

This application was originally filed as PCT Application No. PCT/CN2010/070521 filed Feb. 4, 2010.

BACKGROUND

Service providers (e.g., wireless and cellular services) and device manufacturers are continually challenged to deliver value and convenience to consumers by, for example, providing compelling network services and advancing the underlying technologies. One of interest has been the development of services and technologies for characterizing user behavior with respect to the user's interactions with a device (e.g., a cell phone, smartphone, or other mobile device). More specifically, characterizing user behavior relies, for instance, on correlating user interactions at the device (e.g., making a phone call, accessing an application, etc.) with a context associated with the user or device (e.g., a location, time, date, activity, etc.). However, service providers and device manufacturers face significant technical challenges in making such a correlation because of the differences in the relative sampling frequencies and availability of data between the user interaction data and context data. For example, user interaction data is often collected as discrete data points (e.g., time of phone call) whereas context data is generally collected as a stream of data collected over a period of time at certain frequency.

SOME EXAMPLE EMBODIMENTS

Therefore, there is a need for an approach for characterizing user behavior patterns from user interaction history at a device.

According to one embodiment, a method comprises receiving a plurality of context records from a device. The method also comprises determining one or more contexts from the context records. The method further comprises placing the contexts into one or more context groups. The method further comprises receiving interaction data from the device. The method further comprises associating the context groups with the interaction data. The method further comprises determining a behavior pattern based, at least in part, on the association of the context groups and the interaction data.

According to another embodiment, an apparatus comprising at least one processor, and at least one memory including computer program code, the at least one memory and the computer program code configured to, with the at least one processor, cause, at least in part, the apparatus to receive a plurality of context records from a device. The apparatus is also caused to determine one or more contexts from the context records. The apparatus is further caused to place the contexts into one or more context groups. The apparatus is further caused to receive interaction data from the device. The apparatus is further caused to associate the context groups with the interaction data. The apparatus is further caused to determine a behavior pattern based, at least in part, on the association of the context groups and the interaction data.

According to another embodiment, a computer-readable storage medium carrying one or more sequences of one or more instructions which, when executed by one or more processors, cause, at least in part, an apparatus to receive a plurality of context records from a device. The apparatus is also caused to determine one or more contexts from the context records. The apparatus is further caused to place the contexts into one or more context groups. The apparatus is further caused to receive interaction data from the device. The apparatus is further caused to associate the context groups with the interaction data. The apparatus is further caused to determine a behavior pattern based, at least in part, on the association of the context groups and the interaction data.

According to another embodiment, an apparatus comprises means for receiving a plurality of context records from a device. The apparatus also comprises means for determining one or more contexts from the context records. The apparatus further comprises means for placing the contexts into one or more context groups. The apparatus further comprises means for receiving interaction data from the device. The apparatus further comprises means for associating the context groups with the interaction data. The apparatus further comprises means for determining a behavior pattern based, at least in part, on the association of the context groups and the interaction data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A and 3B are flowcharts of a process for characterizing user behavior patterns, according to one embodiment;

FIGS. 6A-6E are diagrams of user interfaces at a client end utilized in the processes of FIGS. 3A and 3B, according to various embodiments;

FIG. 7 is a diagram of a user interface for a server utilized in the processes of FIGS. 3A and 3B, according to one embodiment;

DESCRIPTION OF SOME EMBODIMENTS

Examples of a method, apparatus, and computer program for characterizing user behavior patterns from user interaction history at a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to a mobile device, it is contemplated that the approach described herein may be used with any other device that supports and maintains a user interaction history and context data.

Figure 1:
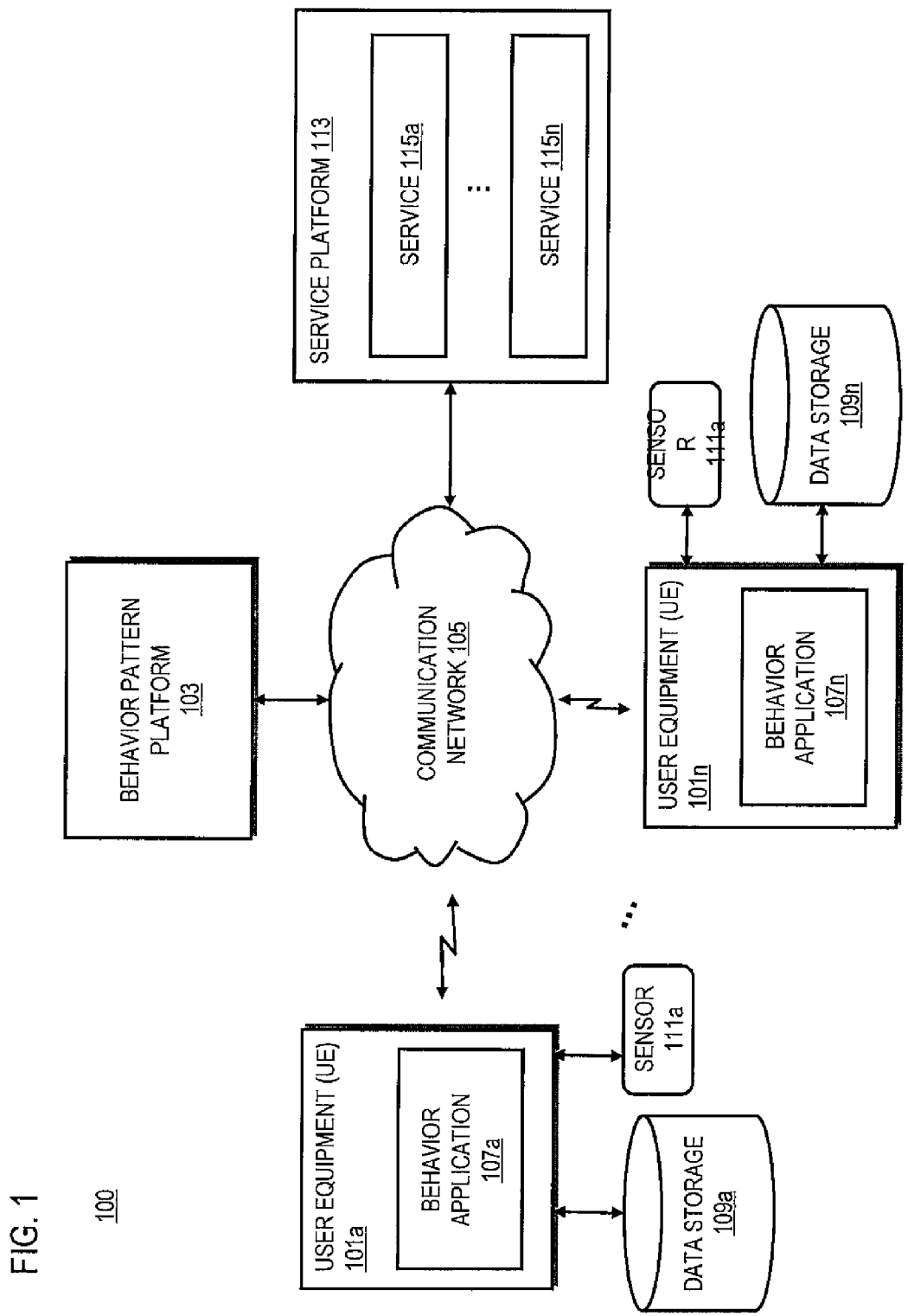
FIG. 1 is a diagram of a system capable of estimating characterizing user behavior patterns from user interaction history at a device, according to one embodiment.

FIG. 1 is a diagram of a system capable of estimating characterizing user behavior patterns from user interaction history at a device, according to one embodiment. As discussed previously, it is noted that how a person uses a device (e.g., a mobile device) can be examined to show specific patterns that represent user behaviors or tendencies. By way of example, some mobile devices keep records of the user's interaction with the device, such as: (1) communicating on the phone, via a text message or an e-mail (e.g. in a form of a communication history); (2) playing media; (3) playing games; (4) using certain applications; etc. Moreover, this user interaction history or data may be recorded with respect to context data associated with the device (e.g., time, location, environmental condition, etc.).

It is noted that because the contexts involving the mobile device are often closely associated with the user interactions, associations between specific contexts and the user interactions may characterize the user's behavior patterns. For example, given a context that the user is waiting for a bus in the evening of a work day and the environment is noisy, the expected behavior pattern (e.g., derived from the user's previously recorded interaction history) is that the user plays a game. In another example, given a context that the user is taking a bus in the morning of a work day, the expected behavior pattern is that the user listens to rock music. In yet another example, given a context that the user is walking in a park in the afternoon of a holiday, the expected behavior pattern is that the user shoots pictures. However, correlating the recorded context data with the user interaction data to determine such user behavior patterns is technically challenging because while the contexts occur and are generally recorded continuously, the user interaction data is recorded occasionally as the interaction occurs.

This disparity between the context data and interaction data leads to, for instance, a relative sparseness of the interaction data with respect to the interaction data. As a result, application of conventional association meaning rules and methods do not yield satisfactory results because the sparseness of the interaction data compared to the context data results in associations with very low confidence. As a result, any detected associations are often not distinguishable from noise or general scatter of the data. Additionally, conventional data mining approaches adapted from continuous or streamed data also are not applicable because the user interaction data comprise discrete and/or event driven data (e.g., the interaction data is collected based on the occurrence of an interaction event such as a phone call or accessing of an application). Accordingly, characterizing behavior patterns from one set of data that includes continuous or streamed data (e.g., context data) and another set of data that includes discrete data (e.g., interaction data) can be problematic.

To address this problem, a system 100 of FIG. 1 introduces the capability to place contexts that are determined from context records acquired from the device into context groups and to associate the context groups with interaction data representing user interaction with the device. In one embodiment, a context record includes, at least in part, all context data and interaction data (e.g., date, time of day, location, activity, etc.) collected at a specific time. The context record may contain or describe several contexts wherein each context is a subset of the context data included in the context record. For example, given a context record including a time, context data, and interaction data, e.g., [time=t1, Context Data=<(Work Day), (Evening), (High Speed), (High Audio Level)>, Interaction=Play Games], various combinations or permutations of the context data can yield various contexts such as: (1)<(Evening)>, (2)<High Speed>, (3)<(Work Day), (Evening)>, etc. As noted, it is contemplated that a context can be any subset of the context data arranged in any combination, which can then be organized as context groups.

Then, the behavior pattern of the user may be determined based on the association of the context groups and the interaction data. In more detail, the system 100 enables effective association of two different types of data (e.g., continuous vs. discrete) for determining the behavior pattern of the user or other type of association (e.g., trends, dependencies, etc.). As discussed previously, the context data is generally continuous over time and is volatile, whereas the interaction data is sparse over time. For example, when both the contexts and the interaction data are organized by timestamps representing different time intervals over a period of time, there may be many instances where there may be some context data but no interaction data corresponding to a certain time stamp because the user generally does not continuously interact with the UE 101. Thus, the system 100 determines the time range over which a common context occurs and places the continuously recorded contexts into context groups associated with the common context. In this way, and the system 100 can associate the contexts (e.g., according to the time ranges represented by the context records in the context groups) with the interaction data, instead of associating individual context records, for determining behavior patterns.

Therefore, an advantage of this approach is that, by placing the contexts into context groups, the context group corresponding to multiple timestamps (e.g., a time range over which the context occurs) may be associated with a single interaction. This way, the sparseness of the interaction in the interaction data is compensated when the interaction is associated with the context group. Hence, an additional advantage of this approach is that this compensation provides a more accurate characterization of user behavior. As a consequence of the more accurate characterization, additional services, content, advertising, personalization options, recommendations, etc. can be targeted to the user that may be of greater relevance or interest to the user. This more precise targeting can, in turn, reduce the amount of unwanted or irrelevant information that is transmitted or offered to the user, thereby also advantageously reducing the bandwidth, memory, and computational resources associated with the transmission. Therefore, means for characterizing user behavior patterns by organizing continuously streamed contexts into context groups that can be more efficiently associated with discrete interaction data are anticipated.

As shown in FIG. 1, the system 100 comprises a user equipment (UE) 101 having connectivity to a behavior pattern platform 103 via a communication network 105. In the example of FIG. 1, the behavior pattern platform 103 collects context data and user interaction history from the UE 101 for determining behavior patterns corresponding to the user associated with the UE 101. As described above, in one embodiment, the behavior pattern platform 103 arranges the context data or records according to the timestamp of each record and places the contexts determined from the context records into context groups based on for instance, the similarity of the contexts (e.g., whether the contexts associated with the same location, environmental condition, user activity, etc.). The platform 103 then analyzes the correlation or association between the context groups and the interaction data to determine user behavior patterns.

In certain embodiments, The UE 101 may include a behavior application 107 for interacting with the behavior pattern platform 103 to perform one or more functions of the behavior pattern platform 103. For example, the behavior application 107 may collect context data and user interaction data for use by the behavior pattern platform 103. More specifically, the can interact with one or more sensors 111 (a sound recorder, light sensor, global positioning system (GPS) device, temperature sensor, motion sensor, accelerometer, and/or any other device that can be used to collect information about surrounding environments associated with the UE 101) to collect the context data. The UE 101 can then store the collected data in, for instance, the data storage 109.

In one embodiment, the behavior application 107 and the behavior pattern platform 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

In another embodiment, the behavior application 107 can operate independently of or without the presence of the behavior pattern platform 103. In this way, the behavior application 107 can perform all of the functions of the behavior pattern platform 103 without transmitting any information to the platform 103, thereby decreasing any potential exposure of the context data and interaction data to external entities. Accordingly, although various embodiments are described with respect to the behavior pattern platform 103, it is contemplated that the functions of the platform 103 can also be performed by the behavior application 107 or similar component of the system 100.

In one embodiment, the behavior pattern platform 103 and/or the behavior application 107 have connectivity to the context data available from, for instance, the service platform 113 which includes one or more services 115a-115n (e.g., weather service, location service, mapping service, media service, etc.). By way of example, these services 115 can provide additional information on environmental conditions (e.g., weather), activities (e.g., playing online games), preferences (e.g., musical preferences), location (e.g., location tracking service), etc. that can provide related context information associated with the UE 101 or the user of the UE 101.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the behavior pattern platform 103, and the service platform 113 with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
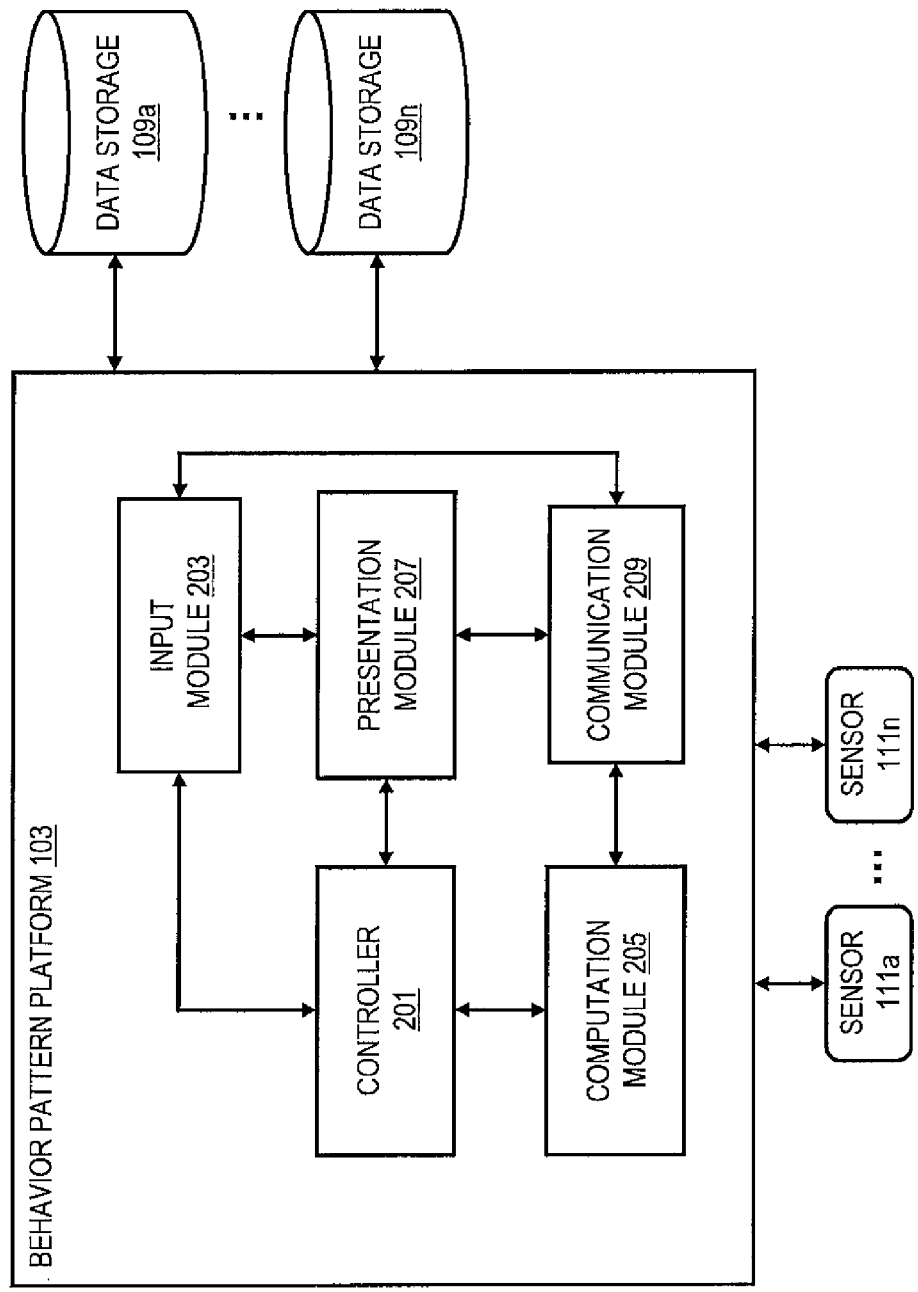
FIG. 2 is a diagram of the components of context pattern platform, according to one embodiment.

FIG. 2 is a diagram of the components of the behavior pattern platform 103, according to one embodiment. By way of example, the behavior pattern platform 103 includes one or more components for characterizing user behavior patterns based on context data and interaction data. It is contemplated that the functions of these components may be combined in one or more components or performed by other components of equivalent functionality. In this embodiment, the behavior pattern platform 103 includes a control module 201, an input module 203, a computation module 205, a presentation module 207 and a communication module 209. The control module 201 oversees tasks, including tasks performed by the control module 201, the input module 203, the computation module 205, the presentation module 207 and the communication module 209. The input module 203 manages and communicates an input into the UE 101, and also communicates information acquired by the sensor modules 111a-111n. The input into the UE 101 may be in various forms including pressing a button on the UE 101, touching a touch screen, scrolling through a dial or a pad, etc. The information acquired by the sensor module 111a-111n may be in various types of data form or an electrical signal that is converted into a data form by the input module 203. Some of the information handled by the input module 203 may be used as context records or interaction data, depending on the type of data. Thus, the input module 203 may receive context records and the interaction data from the device.

The computation module 205 performs computations to determine user behavior patterns from the context data and interaction data. For example, the computation module 205 takes the acquired context records and interaction data, determines contexts from the context records, places the contexts into context groups, and associates the context groups with the interaction data. Then, the computation module 205 determines the user's behavior patterns based on the association between the context groups and the interaction data. The computation module 205 may also arrange the contexts according to the context timestamps, and match the timestamps of interaction data with the timestamps of the context records to facilitate the grouping of the context records. In one embodiment, the computation module 205 also computes a confidence value for behavior patterns determined form the context groups.

In one embodiment, after determination of the behavior patterns, the control logic 201 can interact with the presentation module 207 to, for instance, present a user interface displaying the determined user behavior patterns, types of context data and user interaction data used in computing the behavior pattern, and/or the like. In other embodiments, no presentation of the determined behavior patterns is displayed directly to the user. Instead, the behavior patterns can be used to make recommendations, suggestions, etc. for personalizing services, content, applications, etc. to the user. The determined behavior patterns may also be used to target service offerings or other advertisements that are more likely to be of interest or relevance to the user.

The UE 101 may also be connected to storage media such as the data storage media 109a-109n such that the behavior pattern platform 103 can access or store behavior pattern data and/or related context and interaction data in the data storage media 109a-109n. If the data storage media 109a-109n are not local to the platform 103, then storage media 109a-109n may be accessed via the communication network 105. The UE 101 may also be connected to the service platform 113 via the communication network 105 to access context data provided by the services 115a-115n.

Figure 3B:
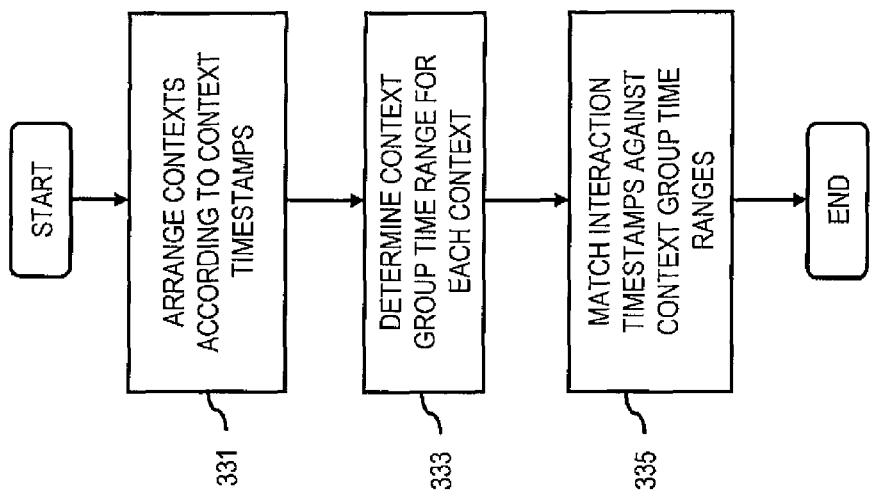

FIGS. 3A and 3B are flowcharts of a process for characterizing user behavior patterns, according to one embodiment. In one embodiment, the behavior pattern platform 103 performs the process 300 of FIG. 3A and the process 330 of FIG. 3B and is implemented in, for instance, a chip set including a processor and a memory as shown FIG. 9. Alternatively, the processes 300 and 330 may also be wholly or partially performed by the behavior application 107.

In step 301, the behavior pattern platform 103 receives context records. The context records may be obtained by recording context features at a predetermined frequency over a period of time. For example, the context features may be recorded every specific time interval, or every time a specific event occurs. In one embodiment, the context records may be obtained from the UE 101, the sensor 111, the service platform 113, or similar component available over the communication network 105. By way of example, the context record may include context features such as time and day, which can be obtained directly from the UE 101. The context record may also include context features such as location information, speed, an audio level and temperature as well as other environmental conditions, which may be collected via a sensor such as a Global Positioning System (GPS) device, an accelerometer, a sound detector, and a temperature sensor. Further, the context record may include context features such as weather information, stock information, and etc., which can be retrieved from the service platform 113, as well as a profile of the user or any other information that may be set within the UE 101. In one embodiment, the context features or elements to include in each of the context records can be determined by, for instance, the service provider, network operator, content provider, advertiser, user, or a combination thereof.

In step 303, the behavior pattern platform 103 determines contexts from the context records. In one embodiment, the contexts may be any combination of the context features included in the context records. For example, for a context record including location information, speed, an audio level and temperature as context features, the context may be any combination of the location information, the speed, the audio level and the temperature. The contexts may be determined automatically by an algorithm or a setting in the UE 101, or the user may define the contexts. For example, the user may specify the number of context features to be included in each context.

In step 305, the contexts are placed into one or more context groups based at least in part on the similarity of chronologically adjacent contexts. In other words, the behavior pattern platform 103 groups contexts together that have similar context values and that occur in adjacent time periods. In this way, the platform 103 can identify when blocks of the continuously streamed context data actually represent a single context occurrence and then group them together as one instance. This grouping advantageously balances the disparity between the abundance of streamed context data with the sparse interaction data to facility data mining and behavior pattern determination. Thus each context group represents a time sequence or segment where the same context is occurring. For example, if the context feature of interest is weather, the platform 103 samples weather data over a period of time and identifies during what time range the weather data indicates is in one state or context (e.g., raining). When the weather changes state (e.g., stops raining), the sequence ends. Therefore, the entire time sequence during which it is raining is grouped into one context group. If the weather becomes sunny, but then starts raining again after a period of time, the second period of rain in placed into a second rain context group. This process is repeated to identify other occurrences of similar context groups (e.g., a rain context group) or different context groups (e.g., a sunny context group).

Although the above example is described with respect to grouping based on a single context feature or element (e.g., weather), it is contemplated that matching may be based on any number of context features. By way of example, each of the contexts has a respective pattern of context values corresponding to the features, and thus the contexts are placed together to form the context groups based on the patterns of the context values. More specifically, similarity of the contexts can be based on how many of the context features in contexts match. The degree of matching (e.g., the number of matching features among a group of contexts) can be predetermined. In certain embodiments, one or more of the features may be specified as a mandatory match (e.g., similarity is determined only if the mandatory features match) or that the features may be arranged in a hierarchy of matching (e.g., one feature must match before the next feature is determined).

Further, the number of the context features considered for matching may be varied. In other words, if there are n available context features, the user may select any one or more of the n context features in any combination for inclusion in a context for subsequent matching. Accordingly, if the user desires to obtain more detailed matching of the patterns of the context values, more context features may be considered for matching. For example, the context features available for inclusion in a context may include "day of the week", "time of day", and "mode of travel". A more detailed context can be constructed by utilizing all three features; whereas a less detailed context can be constructed by choosing, for instance, two of the three available context features (e.g., day of the week, and time of day) for inclusion in the context. It is contemplated that the behavior pattern platform 103 may use any algorithm or procedure for grouping similar contexts into context groups. The grouping process is described in more detail with respect to FIG. 3B below.

Then, in step 307, interaction data including information regarding, for instance, what type of interaction (e.g., data on use applications, services, communication functions, or a combination thereof) and what time are received by the platform 103. Next, the behavior pattern platform 103 initiates the process for associating the context data with each element (e.g., an interaction action such as a phone call) of the interaction data by determining whether any interactions or interaction element occurs in a time range corresponding to one or more of the context groups, as shown in step 309. If an interaction occurs within the time range of a context group, the platform 103 associates the particular interaction with the corresponding context group, as shown in step 311. If an interaction is not present for the context group (e.g., an interaction does not occur within the time range of the context group), the context group is associated with an indication (e.g. N/A) that interaction is not present for the context group, as shown in step 315.

After the association is performed in step 311 and/or step 315, a behavior pattern is determined based on the association of the context groups and the interaction data and a level of confidence computed for the association, as shown in step 313. In one embodiment, the behavior pattern is determined by identifying a one or more context patterns that emerge from the association between the interaction data and the context groups. For example, the behavior pattern platform 103 identifies all similar context groups (e.g., context groups that are based on same context features or elements). With respect to the example above, the behavior pattern platform 103 identifies all of the rain context groups and all of the sunny context groups. For each of the different types of context groups, the platform 103 then determines whether the group is associated with a particular interaction (e.g., plays music) to establish a context pattern to describe what interaction is associated with a particular contest group type. For example, if the platform 103 identifies four rain context groups from the context data and the corresponding context pattern indicates that three of the four context groups are associated with the interaction of playing music, the platform 103 computes a confidence value corresponding to the matching between determined context pattern of the context group (e.g., rain context group) and the interaction of interest (e.g., plays music). If the confidence is above a predetermined threshold, the platform 103 may determine that there is an association between the determined context pattern and interaction. This association can then be used to characterize or determine user behavior patterns (e.g., when it rains, the user plays music).

In some embodiments, the behavior pattern platform 103 may also compute a differentiating factor for each of the determined behavior patterns as a measure of the ability of the respective context group, interaction, or combination thereof to discriminate the determined behavior pattern from other behavior patterns. In other words, the differentiating factor measures how well or how specific the context group is to the determined behavior pattern. For example, a differentiating factor can be calculated to measure whether a rain context group is specific to the behavior pattern of playing music. The differentiating factor would be high if the rain context group only corresponds to the behavior of playing music, but would be low if the rain context group also corresponds or correlates with many other user behavior patterns.

When the behavior pattern of the user is determined, the behavior pattern may be used to provide specific services or tasks. In one embodiment, the behavior pattern platform 103 may be apply the determined user behavior patterns to user segmentation, personalized recommendations, targeted advertising, etc. For example, if the user behavior pattern indicates that the user is on the phone whenever the moving speed of the UE 101 is high, this may show that the user may be on the phone whenever he is driving. Then, a recommendation can be made to the user to purchase a Bluetooth headset or other related products or services. As another example, a user who takes pictures at night in a loud environment at a busy part of a city may indicate that the user goes out to enjoy nightlife, and thus coupons for bars and nightclubs may be sent to the user. Further, the behavior pattern may also be analyzed to form a behavior pattern model that can be used to predict user actions in a certain context. This also can be used for a specified recommendation for the specific context by predicting the user action. This feature is advantageous in that a user tends to pay more attention to specific recommendations or advertisements than to general recommendations or advertisements. General recommendations or advertisements often contain information that is of no or limited interest to the user, thereby wasting limited computational resources, bandwidth, memory, power, etc. of the user's device. Consequently, by identifying behavior patterns can advantageously reduce or provide more efficient use of such resources. Further, the user typically has to browse through a large volume of general information to find recommendations or advertisements that interest the user. The specific recommendations or advertisements based the user behavior pattern would save the user effort and burden of finding recommendations or advertisements of user interest.

The process 300 shown in FIG. 3A may include the process 330 of FIG. 3B. As shown in step 331, the contexts may include context timestamps and may be arranged chronologically according to the context timestamps. Hence, the contexts with similar or same sequences may be grouped if their context timestamps are adjacent to each other as described above. Further, in step 333, a context group time range for each context group is determined based on, for instance, the context timestamps. The context timestamps may also represent the time the data related to the contexts are acquired, wherein the context records including contexts are acquired in a set time interval determined by the context timestamps. Further, as shown in step 335, the interaction data may include interaction timestamps for corresponding interaction data, and the interaction timestamps are matched against the context group time ranges, such that associating of the context groups with the interaction data is based on the matching between the interaction timestamps and the context group time ranges. Then, the interaction data or the interaction described by the interaction data may be associated with the matching context group.

In another embodiment, although not shown, steps 305 and 307 may be performed in a reverse order. Thus, the interaction data may be received before the contexts are placed into context groups. Then, the interaction data may be considered when the context groups are formed such that the timestamps corresponding to the interaction data as well as other nearby timestamps may be focused when forming the context groups. The timestamps nearby the timestamps corresponding to the interaction data may be the timestamps that encompass minutes, hours or even days before and/or after the time of the interaction, depending on the nature of the interaction and/or the number of the context records available.

Table 1 shows an example of context records having four types of context features (e.g., type of day, day period, moving speed, audio level). In this example, each context includes all four types of context features. However, in another example, each context may include less than four types of context features. The timestamp runs from t1-t62, wherein each time stamp represents a specific time of the day. The interaction data may be represented as N/A if there is no interaction between the user and the UE 101 at a particular time. In this example, the adjacent timestamps t2-t4 have the same pattern for the context values of the context features, which are work day, evening, high moving speed and high audio level. Because the timestamps t2-t4 include the contexts including the same pattern, the contexts corresponding to the timestamps t2-t4 may be placed into a common context group. The context group is represented by the context features in bold letters. The interaction data corresponding to timestamps t2 and t4 shows that there were no interactions (i.e., N/A) for timestamps t2 and t4. The interaction data corresponding to timestamp t3 shows that there was an interaction of playing games. Thus, for the context group corresponding to the adjacent timestamps t2-t4, the interaction of playing games is associated with the context group, and the indication of no interactions (i.e. N/A) for the timestamps t2 and t4 is not associated with the context group. Similarly, the contexts corresponding to the adjacent timestamps t28-30 have the same pattern for the context values of the context features, and thus these contexts are placed into another context group consisting of similar context features. In this context group, although the interaction data indicates no interaction for timestamps t29 and t30, because there is an interaction of playing games for t28, this context group is associated with the interaction of playing games. Further, the contexts corresponding to timestamps t49-t52 can also be placed into a context group consisting of similar context features and may be associated with the interaction of playing games. However, if there are no interactions during the time range represented by a particular context group, then the context group may be associated with the indication of no interaction (i.e. N/A). For example, for the context group corresponding to timestamps t64-t66, the indication of no interaction (i.e. N/A) is associated with the context group.

Furthermore, in this example of Table 1, less than four types of the context features may be included in each context to be considered for matching the patterns of the context values. For example, when timestamps t28-t31 are considered, if three types of the context features, Type of day, Day Period and Audio Level, are considered for matching, the timestamps t28-t31 correspond to this pattern. However, if all four types of the context features, Type of day, Day Period, Moving speed and Audio Level, are considered for matching, only the timestamps t28-t30 correspond to this pattern. Although considering more context features for matching the patterns of the context values provides more detailed matching of the patterns, it can result in fewer matches and groupings.

TABLE 1

Context Records and Interactions

| Timestamp | Type of day? | Day Period | Moving speed | Audio Level | Interaction |
|---|---|---|---|---|---|
| t1 | Work day | Afternoon | Low | Middle | N/A |
| t2 | Work day | Evening | High | High | N/A |
| t3 | Work day | Evening | High | High | Play games |
| t4 | Work day | Evening | High | High | N/A |
| ... | | | | | |
| t28 | Work day | Evening | High | High | Play games |
| t29 | Work day | Evening | High | High | N/A |
| t30 | Work day | Evening | High | High | N/A |
| t31 | Work day | Evening | Low | High | N/A |
| ... | | | | | |
| t48 | Work day | Evening | Middle | High | N/A |
| t49 | Work day | Evening | High | High | N/A |
| t50 | Work day | Evening | High | High | N/A |
| t51 | Work day | Evening | High | High | Play games |
| t52 | Work day | Evening | High | High | N/A |
| ... | | | | | |
| t63 | Work day | Evening | Middle | Middle | N/A |
| t64 | Work day | Evening | Zero | Low | N/A |
| t65 | Work day | Evening | Zero | Low | N/A |
| t66 | Work day | Evening | Zero | Low | N/A |

Figure 4:
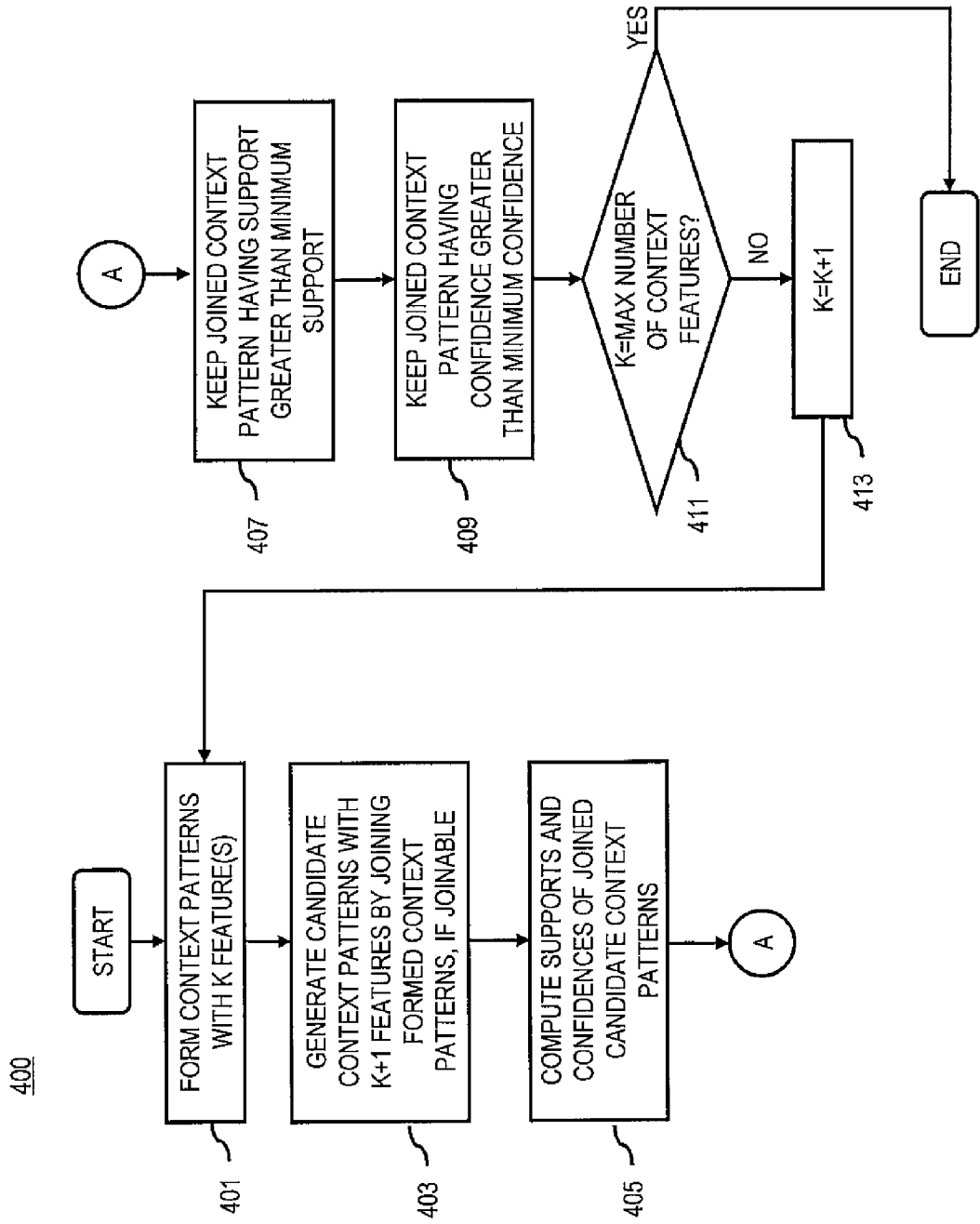
FIG. 4 is a flowchart of a process for generating context patterns using GCPM (Generating candidate context patterns for Context Pattern Mining), according to one embodiment.

FIG. 4 is a flowchart of a process for generating context patterns using GCPM (Generating candidate context patterns for Context Pattern Mining), according to one embodiment. In one embodiment, the behavior pattern platform 103 performs the process 400 and is implemented in, for instance, a chip set including a processor and a memory as shown FIG. 9. Alternatively, the processes 300 and 330 may also be wholly or partially performed by the behavior application 107. In step 401, all context patterns with k features are formed, wherein the initial value of k is 1. In step 403, any combination of two of these context patterns are joined to generate candidate context patterns with k+1 features, if the context patterns are joinable. For example, if k=3, two of the context patterns with three context features may be joined to generate a candidate context pattern with four context features. In step 405, supports and confidences of joined candidate context patterns are computed. Computations of the support and the confidence are later discussed in more detail. In step 407, if the support of the joined context pattern is greater than a minimum support, then the joined context pattern is kept. Further, in step 409, if the confidence of the joined context pattern is greater than a minimum confidence, the joined context pattern is kept. If the joined context pattern does not satisfy either or both of the conditions in steps 407 and 409, then the joined context pattern is discarded and is not considered. Step 411 determines whether k is equal to the maximum number of context features. If k is equal to the maximum number of context features, then the process ends. If k is not equal to the maximum number of context features, k is set to be k+1, and loops back to step 401 to start the process again with the new k value.

The support of a context pattern C with respect to an interaction I may be calculated based on the following equation:

$$\text{The support of } C \text{ with respect to } I = \Sigma_m \text{match\_num}_m(I) \quad (1)$$

where match_num(I) means the number of context records in which C occurs during the m-th context range (i.e., the time range of a context) of C. In the example shown in Table 1, the number of context records with the context pattern (i.e. workday, evening, high and high for type of day, day period, moving speed and audio level, respectively) with respect to the interaction of playing games during the context range of timestamps t1-t66 is 3, which is the support of C with respect to I.

According to a conventional method, the confidence of a context pattern C with respect to an interaction I may be calculated based on the following equation: The confidence of C with respect to I:

$$= \frac{\text{support\_of\_C\_w.r.t.\_I}}{\text{support\_of\_C}} \quad (2)$$

$$= \frac{\sum_m \text{match\_num}_m(I)}{\sum_{I' \in \Gamma} \sum_m \text{match\_num}_m(I') + N_{I_0}}$$

wherein $\Gamma$ means the set of all interactions and $N_{I_0}$ means the number of context ranges of C without any interactions. Thus, according to a conventional method, for the example shown in Table 1, the support of the context pattern (i.e. workday, evening, high and high for type of day, day period, moving speed and audio level, respectively) is 10. Thus, the confidence of C with respect to I, according to the conventional method, is 3/10=30%. The confidence according to the conventional method is generally very low because the contexts are continuous and volatile and the user interactions are sparse in time.

The present approach compensates for these two different natures of context information and the user interaction information. According to the present approach, the confidence of C with respect to I is:

$$\text{confidence of } C \text{ with respect to } I = \frac{\text{support\_of\_Cgroup\_w.r.t.\_I}}{\text{support\_of\_Cgroup}} \quad (3)$$

wherein Cgroup is a context group having the same context pattern. Thus, according to the present approach, for the example shown in Table 1, the support of the context group for the context pattern is 3, because there are three context groups with the same context pattern (i.e. workday, evening, high and high for type of day, day period, moving speed and audio level, respectively), wherein the three context groups belong to the time stamps t2-t4, t28-t30 and t49-t52. Further, the support of the context group for the context pattern with respect to the interaction of playing games is also 3. Therefore, the confidence of the context pattern with respect to interaction of playing games, according to the present approach, is 3/3=100%.

The process 400 shown in FIG. 4 may be implemented using an algorithm called GCPM (Generating candidate context patterns for Context Pattern Mining). The following pseudo code is an example implementation of the GCPM used in the process 400. In the pseudo code, lines 1-4 initialize a support counter as an initialization process of the GCPM. Then, in lines 5-12, a support for each context pattern $C_i^k$.support is computed. In lines 13-17, a confidence for each context pattern is computed, and the code checks whether each context pattern has a support and a confidence greater than a minimum support (i.e., min_support) and a minimum confidence (i.e., min_confidence), respectively. In lines 18-25, the context patterns (i.e., context pair) are joined to form another context pattern if the context patterns have supports greater than the minimum support and are joinable. Lines 26-30 check whether this process can be repeated for joined context patterns, and determines whether to go to line 2 to repeat the process again.

Pseudo Code: GCPM

Input1: a sequence of context records $R = r_1 r_2 \ldots r_{NR}$;
Input2: feature set $F = \{f_1, f_2, \ldots, f_K\}$;
Input3: interaction set $\Gamma = \{I_1, I_2, \ldots, I_N\}$;
Input4: min_support, min_conf;
Output: the set of context patterns $\Theta$;
Initialization: construct $\Lambda^l = \{C_i^l\}$, l = 1;

```
1:   //Init support counter
2:   for each C_i^k ∈ Λ^l do
3:       for 0 ≤ n ≤ N_l do
4:           set C_i^k · support[n] = 0;
5:   //Count support
6:   for each r ∈ R do
7:       for each C_i^k ∈ Λ^l do
8:           if r ⊥ C_i^k then
9:               if ∃_1 ≤ n ≤ N_l^{jn} ∈ r then
10:                  C_i^k · support[n] + +;
11:              else if /∃_1 ≤ n ≤ N_l^{jn} ∈ C_i^k · R_{near} then
12:                  C_i^k · support[0] + +;
13:  //Count confidence
14:  for each C_i^k ∈ Λ^l do
15:      for 1 ≤ n ≤ N_l do
16:          if C_i^k · support[n] > min_support and
```

$$\frac{C_i^k \cdot \text{support}[n]}{\sum_{m=0}^{N_l} C_i^k \cdot \text{support}[m]} > \text{min\_conf then}$$

```
17:          put C_i^k w.r.t. I_n into Θ.
18:  //Construct Λ^{l+1}
19:  Λ^{l+1} = φ;
20:  for each context pair C_i^k, C_j^k, where C_i^k, C_j^k ∈ Λ^l do
21:      for 1 ≤ n ≤ N_l do
22:          if C_i^k · support[n] > min_support and C_j^k · support[n] > min_support then
23:              if C_i^k and C_j^k can join then
24:                  put C_i^k · C_j^k into Λ^{l+1}.
25:                  break;
26:  if Λ^{l+1} = φ then
27:      return Θ;
28:  else
```

-continued

Pseudo Code: GCPM

```
29:      I++
30:    go to 2);
```

Figure 5A:
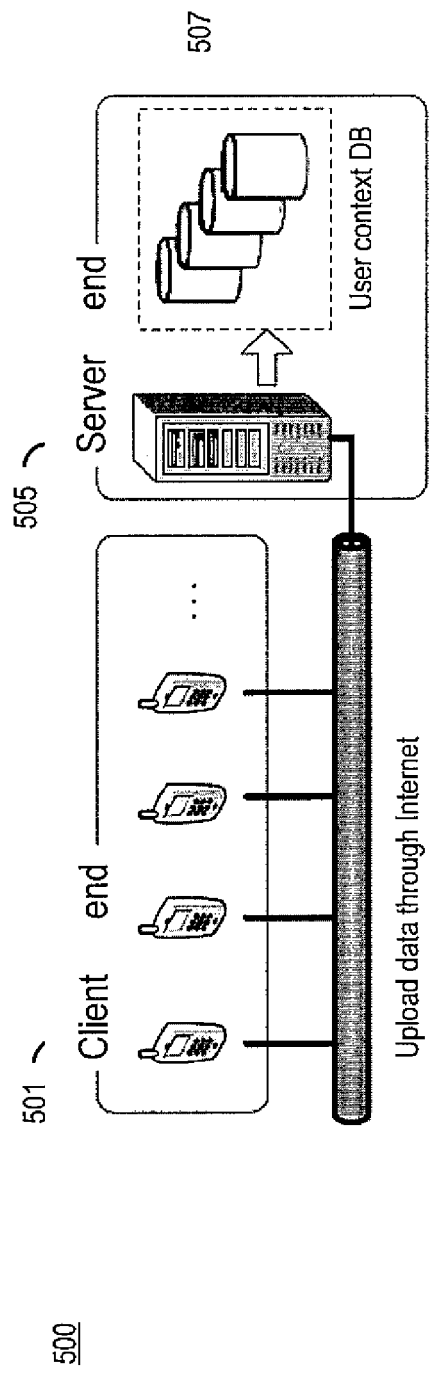
FIGS. 5A and 5B are diagrams of interactions between a client and a server utilized in data mining included in the processes of FIGS. 3A and 3B, according to various embodiments, according to various embodiments.
Figure 5B:
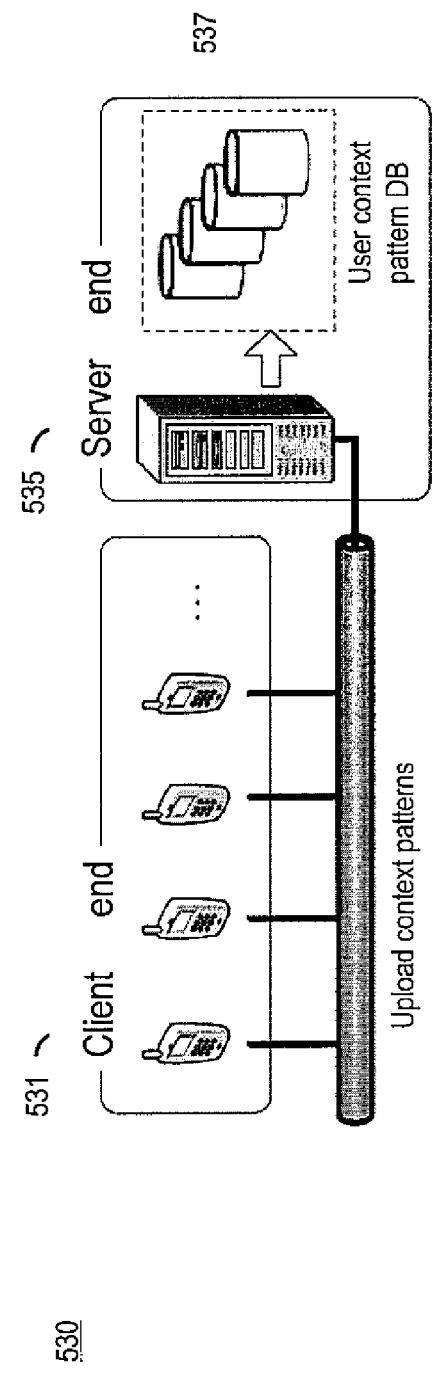

FIGS. 5A and 5B are diagrams of interactions between a client and a server utilized in data mining included in the processes of FIGS. 3A and 3B, according to various embodiments. FIG. 5A shows that data such as context records retrieved at the client end 501 from mobile devices 503 (e.g., UEs 101a-101n), may be uploaded to the server end 505 through the Internet (e.g., communication network 105). In one embodiment, the server end 505 may include the behavior platform 103 and/or the service platform 113. At the server end 505, the uploaded data is stored in the user context database 507. This embodiment is advantageous in that the mobile devices 503 can reduce their computational burdens associated with the data mining to the server 509. It is noted that the server 509 generally has more processing power and related resources (e.g., bandwidth, memory, etc.) than the mobile devices to handle this type of computation. Alternatively, as shown in FIG. 5B, the data retrieved by the mobile devices 533 at the client end 531 may be stored at storage media (not shown) of the respective mobile devices 533. The mobile devices 533 may then locally perform the computations for determining, for instance, the context patterns from the data. Then, the result of the computation (e.g., the context patterns) may be uploaded to the server end 535 including a server 539 and user context pattern database 537. This embodiment is advantageous in that the data is kept within the respective mobile devices 533, and is not uploaded to other devices or servers without the user's permission. Thus, this embodiment in FIG. 5B provides a higher level of privacy protection. In addition, for both embodiments in FIGS. 5A and 5B, the user of the mobile device may configure a privacy setting to determine whether any data retrieved from the mobile device can be sent to the server end 535. Further, although not shown, much of the analysis of the behavior pattern according to this invention may be performed within the mobile device 533 even when the mobile device 533 is not connected to the server 539. As long as the mobile device 533 has the data and sufficient processing power to analyze the data, then the server 539 may not be required to perform the analysis.

Figure 6E:
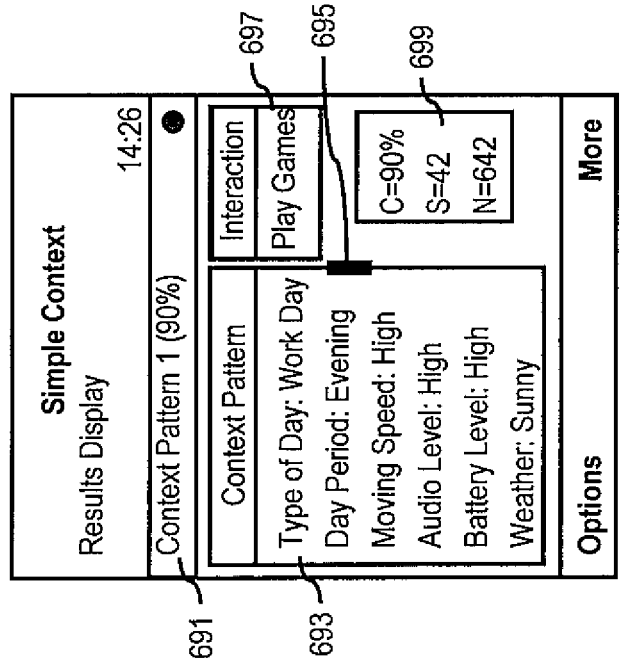

FIGS. 6A-6E are diagrams of user interfaces at a client end utilized in the processes of FIGS. 3A and 3B, according to various embodiments. FIG. 6A shows a user interface 600 of a mobile device. The information window 601 shows that the user interface for "simple context" and related information, and further shows that context records are in the process of being uploaded. The list 603 shows the available context features that can be selected to be configured in the context records for uploading. The options 605 provides additional options (e.g., privacy filters, searches, etc.) that can be configured and the more option 607 may be selected to show additional context features that can be configured.

FIG. 6B shows a user interface 630 showing configuration options for context features available at the mobile device. In the example shown in FIG. 6B, alarm 631 is selected to be configured. Once alarm 631 is selected, expandable menu 633 is displayed. The user can browse and select among the menu options 635. In this example, module option 633 is selected, which further displays additional options to enable modules, to disable modules or to change sample rate for gathering alarm-related context information. FIG. 6C shows a user interface 650 that enables a user to choose data sources or sensors for collection of context records. The context menu 651 shows a list of context features or context sources from which context records can be collected. In the example shown in FIG. 6C, Accelerometer, Current Status and Audio Level are selected. Thus, the context records retrieved from this mobile device will include these three context features.

Figure 6D:
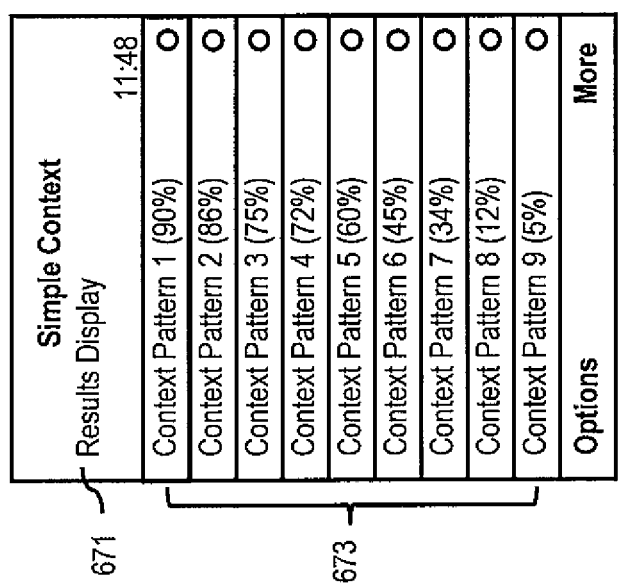

FIG. 6D depicts a user interface 670 for displaying determined context patterns and their respective confidence values. As shown, the information window 671 identifies that the user interface 670 is for "Results Display." Moreover, the user interface 670 presents a list of context patterns 673 scored in a descending order of confidence values. One of these context patterns may be selected to display more details about the context patterns, as shown in the user interface 690 of FIG. 6E. In the example of FIG. 6E, Context Pattern 1 691 has selected to display additional details. Accordingly, the context pattern window 693 displays context features corresponding to Context Pattern 1. The context pattern window 693 also has a scroll 695 to scroll up and down the context pattern window 693. The interaction window 697 displays what interaction is matched with Context Pattern 1. The confidence window 699 shows a confidence value, a support value, and a number of context records considered in computing the confidence and the support values. In this example, the confidence window 699 shows the confidence of 90%, a support of 42, and that 642 context records were considered to compute the confidence and the support.

FIG. 7 is a diagram of a user interface for a server utilized in the processes of FIGS. 3A and 3B, according to one embodiment. The server user interface 700 enables monitoring the status of users and their context records. The user box 701 shows a user id nrcbj.006, and the most recent time when a context record was retrieved (e.g., 1 hour as shown in this example). The "show gps" option 703 can be selected to invoke a separate window to show current or historical location information associated with the UE 101t. The "clear" option 705 clears all the context records associated with the user that has been collected to date. The statistics option 707 enables a user to select a time period for the retrieved data to be displayed in the statistics window 709. As shown, the available time periods for the statistics option 707 are 1 day, 5 days, 1 week, 1 month, 3 months, 6 months, 1 year, and MAX. These represent the time period over which retrieved context records are displayed in the statistics window 709. For example, if the 5 days option is selected, statistics of data retrieved during the past 5 days are displayed, and if the MAX option is selected, the statistics of all data retrieved in the past are displayed. The statistics window 709 displays the statistics in two different ways, by the number of records as shown in the left pie 711, and by the size of data as shown in the right pie 713.

The processes described herein for characterizing user behavior patterns may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
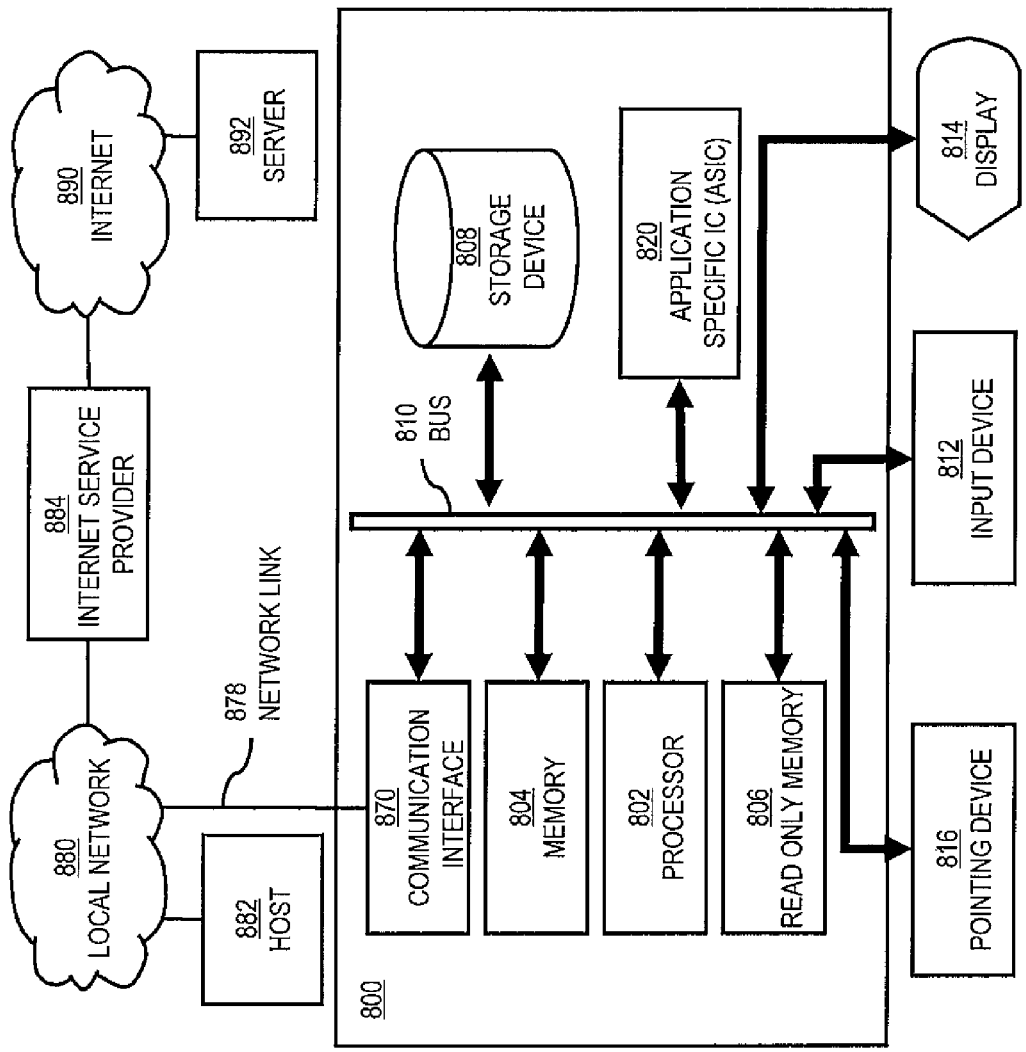
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to characterize user behavior patterns as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of characterizing user behavior patterns.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to characterizing user behavior patterns. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for characterizing user behavior patterns. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for characterizing user behavior patterns, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for characterizing user behavior patterns.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
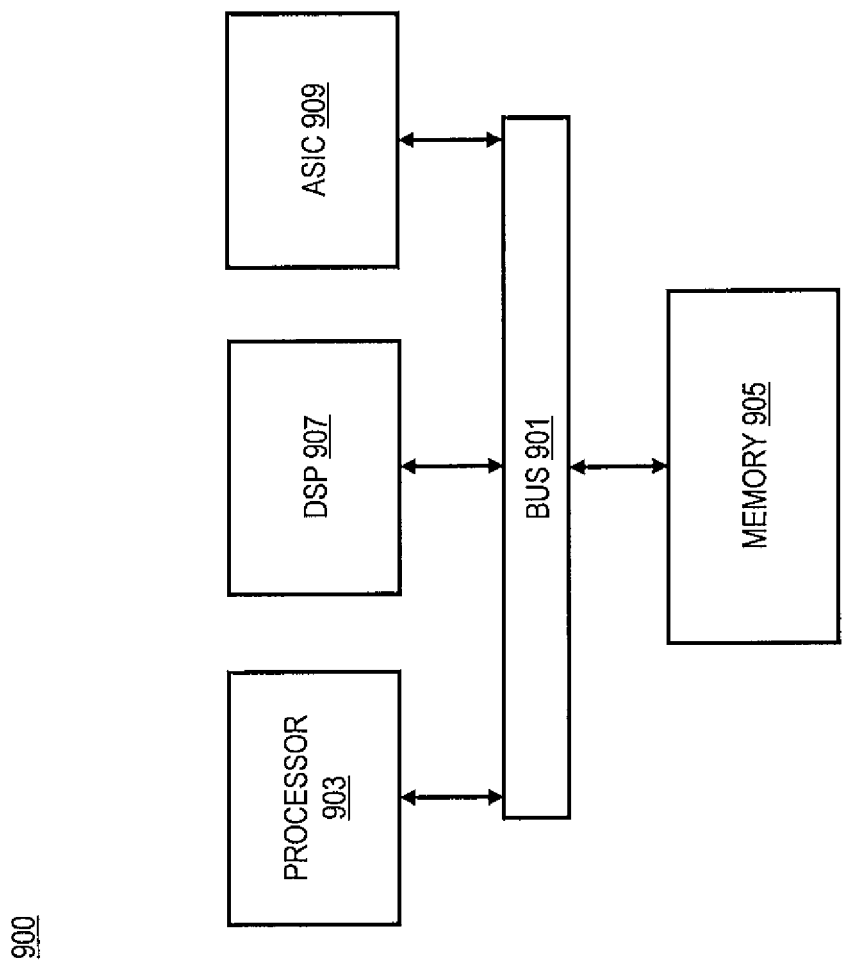
FIG. 9 is a diagram of a chip set that can be used to implement an embodiment of the invention.

FIG. 9 illustrates a chip set 900 upon which an embodiment of the invention may be implemented. Chip set 900 is programmed to characterize user behavior patterns as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of characterizing user behavior patterns.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to characterize user behavior patterns. The memory 905 also stores the data associated with or generated by the execution of the inventive steps.

Figure 10:
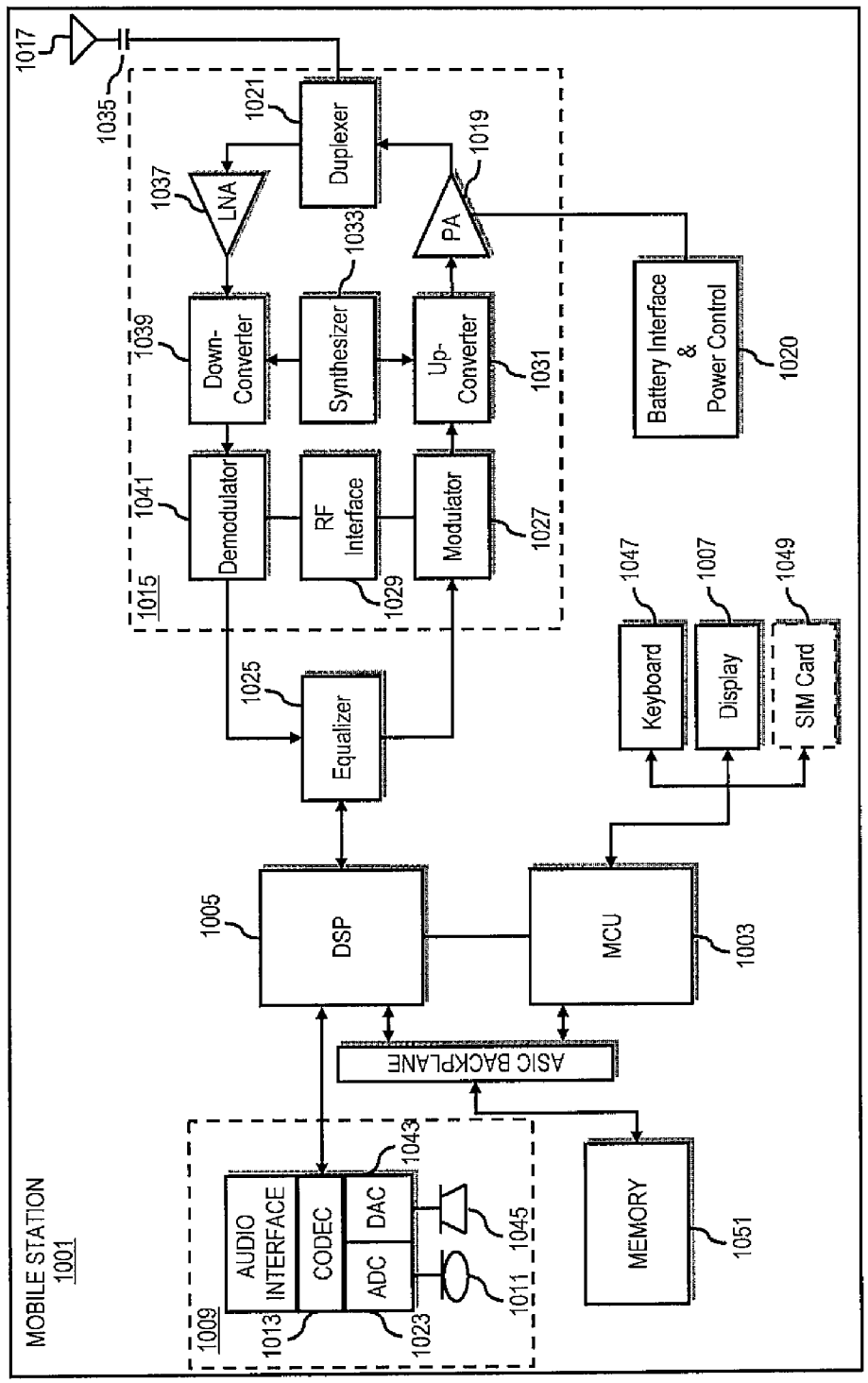
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of characterizing user behavior patterns. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of characterizing user behavior patterns. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to characterize user behavior patterns. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more common contexts from one or more context records associated with a target;
   placing the one or more common contexts into one or more context groups;
   grouping chronologically adjacent context records into a plurality of context record groups based, at least in part, on the one or more context groups, wherein context records in each of the context record groups respectively correspond to one of a plurality of non-overlapping and chronologically continuous time segments;
   detecting at least one association between the one or more context groups and target interaction data within each of the context record groups; and
   determining a behavior pattern of the target based, at least in part, on a number of the context record groups sharing at least one common target interaction.

2. A method of claim 1, wherein each of the context records includes a context timestamp, the chronologically adjacent context records within each one of the context record groups share one or more common contexts, and wherein the method further comprising:
   determining a time range for each of the context record groups based, at least in part, on the respective context timestamps of the context records placed in the context record groups.

3. A method of claim 2, wherein each of the context records includes one or more context features and respective context values, and the method further comprises:
   selecting one or more of the context features and respective context values to represent the one or more common contexts; and
   matching the chronologically adjacent context records based, at least in part, on the selected context features and respective context values to determine a similarity between the chronologically adjacent context records.

4. A method of claim 2, wherein each element of the target interaction data includes an interaction timestamp, and the method further comprising:
   matching the interaction timestamps against the context record group time ranges,
   wherein the associating of the context groups with the target interaction data is based, at least in part, on the matching.

5. A method of claim 1, wherein the associating of the context groups with the target interaction data comprises:
   computing a confidence for each of the one or more context groups with respect to the at least one common target interaction based, at least in part, on the number of the context record groups, wherein the behavior pattern of the target is determined based, at least in part, on the confidence.

6. A method of claim 1, further comprising:
   causing, at least in part, application of the user behavior pattern to user segmentation, personalized recommendations, targeted advertising, or a combination thereof.

7. A method of claim 1, further comprising:
   computing a differentiating factor for each of the context groups, the target interaction data, or a combination thereof,
   wherein the differentiating factor is a measure of an ability of the respective context group, target interaction data, or combination thereof, to discriminate the determined behavior pattern from other behavior patterns.

8. A method of claim 1, wherein the target is a user, the target interaction data is associated with one or more user interactions with one or more user devices, and the context records include a date, a time, a location, a speed, an environmental condition, a weather condition, a profile, or a combination thereof.

9. A method of claim 1, wherein the target interaction data comprises data on use applications, services, communication functions, or a combination thereof.

10. An apparatus comprising:
    at least one processor; and
    at least one memory including computer program code,
    the at least one memory and the computer program code configured to, with the at least one processor, cause the apparatus to perform at least the following,
    determine one or more common contexts from one or more context records associated with a target;
    place the one or more common contexts into one or more context groups;

group chronologically adjacent context records into a plurality of context record groups based, at least in part, on the one or more context groups, wherein context records in each of the context record groups respectively correspond to one of a plurality of non-overlapping and chronologically continuous time segments;

detect at least one association between the context groups and target interaction data within each of the context record groups; and determine a behavior pattern of the target based, at least in part, on a number of the context record groups sharing at least one common target interaction.

11. An apparatus of claim 10, wherein each of the context records includes a context timestamp, and wherein during the placing of the common contexts into the context record groups the apparatus is further caused, at least in part, to:

arrange the context records according to the context timestamps, wherein the placing of the common contexts into the context record groups is determined based, at least in part, on a similarity between adjacently arranged context records; and determine a time range for each of the context record groups based, at least in part, on the respective context timestamps of the context records placed in the context record groups.

12. An apparatus of claim 11, wherein each of the context records includes one or more context features, and the apparatus is further caused, at least in part, to:

select one or more of the context features to represent the one or more common contexts;

match the chronologically adjacent context records based, at least in part, on the selected context features, wherein the similarity between chronologically adjacent context records is based, at least in part, on the matching.

13. An apparatus of claim 11, wherein each element of the target interaction data includes an interaction timestamp, and the apparatus is further caused, at least in part, to:

match the interaction timestamps against the context record group time ranges, wherein the associating of the context groups with the target interaction data is based, at least in part, on the matching.

14. An apparatus of claim 10, wherein during the associating of the context groups with the target interaction data the apparatus is further caused, at least in part, to:

determine one or more context patterns from the context record groups with respect to one or more elements of the target interaction data;

compute a confidence for each of the one or more context patterns; and determine an association between the each of the one or more context patterns and the respective one or more elements of the target interaction data based, at least in part, on the respective confidence.

15. An apparatus of claim 10, wherein the apparatus is further caused, at least in part, to:

cause, at least in part, application of the user behavior pattern to user segmentation, personalized recommendations, targeted advertising, or a combination thereof.

16. An apparatus of claim 10, wherein the apparatus is further caused, at least in part, to:

computing a differentiating factor for each of the context groups, the target interaction data, or a combination thereof, wherein the differentiating factor is a measure of an ability of the respective context group, interaction data, or combination thereof, to discriminate the determined behavior pattern from other behavior patterns.

17. An apparatus of claim 10, wherein the context records include a date, a time, a location, a speed, an environmental condition, a weather condition, a profile, or a combination thereof.

18. An apparatus of claim 10, wherein the target interaction data comprises data on use applications, services, communication functions, or a combination thereof.

19. An apparatus of claim 10, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

20. A non-transitory computer-readable storage medium carrying one or more sequences of one or more instructions which, when executed by one or more processors, cause an apparatus to at least perform the following steps:

determining one or more common contexts from one or more context records associated with a target;

placing the one or more common contexts into one or more context groups;

grouping chronologically adjacent context records into a plurality of context record groups based, at least in part, on the one or more context groups, wherein context records in each of the context record groups respectively correspond to one of a plurality of non-overlapping and chronologically continuous time segments;

detecting at least one association between the one or more context groups and target interaction data within each of the context record groups; and determining a behavior pattern of the target based, at least in part, on a number of the context record groups sharing at least one common target interaction.

* * * * *